United States Patent
Taki et al.

(10) Patent No.: US 7,846,863 B2
(45) Date of Patent: Dec. 7, 2010

(54) EXHAUST GAS PURIFYING CATALYST

(75) Inventors: Kenichi Taki, Kakegawa (JP); Akimasa Hirai, Kakegawa (JP); Hiromasa Suzuki, Kakegawa (JP)

(73) Assignee: Cataler Corporation, Shizuoka-Ken (JP)

( * ) Notice: Subject to any disclaimer, the term of this patent is extended or adjusted under 35 U.S.C. 154(b) by 1213 days.

(21) Appl. No.: 11/318,190

(22) Filed: Dec. 23, 2005

(65) Prior Publication Data

US 2006/0142151 A1 Jun. 29, 2006

(30) Foreign Application Priority Data

Dec. 27, 2004 (JP) ............... 2004-377850

(51) Int. Cl.
*B01J 23/01* (2006.01)
(52) U.S. Cl. ...................... 502/304; 502/303
(58) Field of Classification Search ............. 502/304
See application file for complete search history.

(56) References Cited

U.S. PATENT DOCUMENTS

| 6,150,299 | A | * | 11/2000 | Umemoto et al. | ........ 502/304 |
| 6,217,831 | B1 | * | 4/2001 | Suzuki et al. | ........ 422/177 |
| 2001/0031699 | A1 | | 10/2001 | Matsumoto et al. | |
| 2003/0083193 | A1 | | 5/2003 | Takaya et al. | |

FOREIGN PATENT DOCUMENTS

| EP | 0507590 | | 10/1992 |
| EP | 0885657 | | 12/1998 |
| EP | 1136115 A1 | * | 9/2001 |
| JP | 3196841 | | 8/1991 |
| JP | 05023593 | | 2/1993 |
| JP | 5023593 | | 2/1993 |
| JP | 5-049940 | | 3/1993 |
| JP | 2000-502602 | | 3/2000 |
| JP | 2001-162166 | | 6/2001 |
| JP | 2001-259424 | | 9/2001 |
| WO | 9723278 | | 4/1997 |
| WO | 97/23278 | | 7/1997 |

* cited by examiner

*Primary Examiner*—Melvin C Mayes
*Assistant Examiner*—Kenneth Vaden
(74) *Attorney, Agent, or Firm*—Davis & Bujold, P.L.L.C.

(57) ABSTRACT

An exhaust gas purifying catalyst comprises a substrate having a through hole serving as a passage for exhaust gas; and a catalyst coating layer formed on an internal surface of the through hole. The catalyst coating layer contains: a component (i): a precious metal; and a component (ii): at least one of a Zr oxide, a Ce oxide and a ZrCe mixed oxide. On an upstream portion of the passage, an oxide equivalent weight of Zr is within a range of 51-100 wt % of an oxide equivalent weight of Zr and Ce contained in the component (ii). On a downstream portion of the passage, the component (ii) includes at least one of a Ce oxide and a ZrCe mixed oxide in which an oxide equivalent weight of Ce is within a range of 58-100 wt % of an oxide equivalent weight of Zr and Ce contained in the ZrCe mixed oxide.

2 Claims, 7 Drawing Sheets

EXHAUST GAS PURIFYING CATALYST

This application claims priority from Japanese Application Serial No. 2004-377850 filed Dec. 27, 2004.

BACKGROUND OF THE INVENTION (i) Field of the Invention

The present invention relates to an exhaust gas purifying catalyst that removes toxic substances contained in exhaust gas from an internal combustion engine of an automobile, a motorcycle, and others.

(ii) Background Art

A variety of catalysts for purifying exhaust gas emitted from an internal combustion engine of an automobile and the like have been provided. These days, most of the catalysts are three-way catalysts that purify HC, CO, and NOx at the same time. Such catalysts are disclosed, for example, in Publication of Unexamined Japanese Patent Application No. Hei 3-196841, Publication of Unexamined Japanese Patent Application No. Hei 5-23593 and Publication of Unexamined Japanese Patent Application No. 2001-259424.

In one example of the three-way catalyst, one of or a combination of catalytic components, such as Pt, Pd and Rh, is dispersed in and carried by a refractory inorganic compound powder, such as alumina and ceria-zirconia, to form a catalytic composition. Then the catalytic composition is applied to cover a honeycomb substrate made of cordurite, metal and the like.

In another example of the three-way catalyst, a honeycomb substrate made of cordurite, metal and the like is covered with a refractory inorganic oxide, such as alumina and ceria-zirconia, and is soaked in a slurry containing one of or a combination of catalytic components, such as Pt, Pd and Rh, so as to carry the catalytic components.

SUMMARY OF THE INVENTION

Due to the recent tightening of regulations on exhaust gas, catalysts are required to further reduce HC, CO, and NOx. However, conventional exhaust gas purifying catalysts cannot always comply sufficiently with stricter regulations. Especially, it is required to improve the performance to remove toxic substances immediately after an internal combustion engine is started, a period when the exhaust gas purifying catalyst has not been warmed up yet (the warm-up performance). In addition, it is required to improve the performance to remove toxic substances after the internal combustion engine is operated for a long time period (the durability).

The present invention, which has been made in view of the above circumstances, has an object to provide an exhaust gas purifying catalyst which has an improved warm-up performance and an improved durability.

To attain the above object, there is provided an exhaust gas purifying catalyst which comprises a substrate having a through hole penetrating the substrate in an axial direction and a catalyst coating layer formed on an internal surface of the through hole. The catalyst coating layer contains a component (i): a precious metal and a component (ii): at least one of a Zr oxide, a Ce oxide and a ZrCe mixed oxide. The through hole forms a passage for exhaust gas. An oxide equivalent weight of Zr contained in the component (ii) is within a range of 51 to 100 wt % of an oxide equivalent weight of Zr and Ce contained in the component (ii) in the catalyst coating layer formed in an area A located on an upstream portion of the passage with respect to a flow direction of exhaust gas. The component (ii) includes at least one of a Ce oxide and a ZrCe mixed oxide in which an oxide equivalent weight of Ce contained in the ZrCe mixed oxide is within a range of 58 to 100 wt % of an oxide equivalent weight of Zr and Ce contained in the ZrCe mixed oxide in the catalyst coating layer formed in an area B located on a downstream portion of the passage with respect to the flow direction of exhaust gas.

According to the exhaust gas purifying catalyst in the present invention, in the catalyst coating layer formed in the area A the oxide equivalent content of Zr (i.e., the weight of $ZrO_2$) contained in the component (ii) is within a range of 51 to 100 wt % (preferably within a range of 55 to 85 wt %, and is more preferably within a range of 60 to 80 wt %) of an oxide equivalent weight of Zr and Ce (i.e., a sum of the weight of $ZrO_2$ and the weight of $CeO_2$) contained in the component (ii) present in the area A.

Accordingly, the precious metal (e.g., Pt and Rh) contained in the catalyst coating layer formed in the area A is stabilized. This leads to a reduced OSC performance (oxide storage performance) and a secure HC removal performance. As a result, a high HC removal performance can be achieved even immediately after an internal combustion engine is started, the time period in which the exhaust gas purifying catalyst has not yet been warmed up. That is, an effective warm-up performance can be achieved.

Also, according to the exhaust gas purifying catalyst in the present invention, the component (ii) constituting the catalyst coating layer formed in the area B includes at least one of a Ce oxide and a ZrCe mixed oxide in which an oxide equivalent content of Ce contained in the ZrCe mixed oxide is within a range of 58 to 100 wt % of an oxide equivalent weight of Zr and Ce contained in the ZrCe mixed oxide. Accordingly, the catalyst coating layer formed in the area B has an effective OSC performance, and NOx and CO removal performance is secured. As a result, the exhaust gas purifying catalyst in the present invention can provide an improved performance to remove toxic substances such as NOx even after the internal combustion engine is operated for a long time period. That is, an effective level of durability can be achieved.

The component (ii) in the area A may be, for example, (1) a single Zr oxide, (2) a combination of a Zr oxide and a Ce oxide, (3) a combination of a Zr oxide and a ZrCe mixed oxide and (4) a combination of a Zr oxide, a Ce oxide, and a ZrCe mixed oxide.

According to the exhaust gas purifying catalyst in the present invention, a passage for exhaust gas can be formed by a through hole provided in a single substrate. In this case, the area A and the area B are formed in the through hole provided in the single substrate. The area A, which is required to be located upstream from the area B, is preferably an area including an end as an exhaust gas entrance in the through hole. The area B, which is required to be located downstream from the area A, is preferably an area including an end as an exhaust gas exit in the through hole. The through hole may consist only of the area A and the area B, but may also include an area other than the area A and the area B, for example, on an upstream side of the area A, between the area A and the area B, or on a downstream side of the area B.

Further, the exhaust gas purifying catalyst in the present invention may be provided with two or more substrates such that the passage of exhaust gas may be formed by combining the through holes respectively provided in the substrates. In this case, it may be possible to form the area A in the through hole of one substrate and form the area B in the through hole of another substrate. Then, the substrate with the area A is arranged on an upstream side in an exhaust gas flow direction, while the substrate with the area B is arranged on a downstream side in the exhaust gas flow direction.

A length of the area A along the passage of exhaust gas is preferably 10-50%, is more preferably 30-50%, and is further more preferably 40-50%, of the entire length of the passage. When the passage is formed by two or more substrates, the entire length of the passage is obtained by adding the lengths of the respective through holes along the exhaust gas flow. By defining the proportion of the length of the area A along the passage to the entire length of the passage, further improvements can be achieved in the warm-up performance and the durability.

A proportion of a weight of the precious metal contained in the catalyst coating layer formed in the area A to a weight of the precious metal contained in the catalyst coating layer formed in the area B is preferably within a range of 2:1 to 10:1. The proportion is more preferably within a range of 2:1 to 5:1, and is further more preferably within a range of 2:1 to 3:1. By defining the proportion between the weight of the precious metal contained in the catalyst coating layer formed in the area A and the weight of the precious metal contained in the catalyst coating layer formed in the area B, further improvements in the warm-up performance and the durability can be achieved.

The precious metal contained in the catalyst coating layer formed in the area A preferably includes at least one of Pd and Rh. The catalyst coating layer formed in the area A preferably further contains Pt as the precious metal. The catalyst coating layer formed in the area B preferably contains at least one of Pt, Pd and Rh as the precious metal. A preferable amount of the precious metal is within a range of 2-10 g per liter of the catalyst The catalyst coating layer formed in the area A and/or in the area B preferably includes a refractory inorganic oxide. Examples of the refractory inorganic oxide are alumina (especially activated alumina), Zr oxide, Ce oxide, ZrCe mixed oxide, silica and titania. A preferable amount of the refractory inorganic oxide is within a range of 20-80 g per liter of the catalyst.

There is no particular limitation to the above-mentioned substrate as long as the substrate is usually used for an exhaust gas purifying catalyst. For example, a honeycomb substrate, a corrugated substrate, and a monolith honeycomb substrate may be employed. The substrate may be made of any refractory material. For example, an integrally structured substrate made of refractory ceramic, such as cordierite, or of metal, such as ferrite stainless steel, may be employed.

The catalyst coating layer formed in the area A and the catalyst coating layer formed in the area B preferably contain the element barium and the element lanthanum. A preferable amount of barium and lanthanum is within a range of 15-30 g per liter of the catalyst.

BRIEF DESCRIPTION OF THE DRAWINGS

Preferred embodiments of the present invention will be described hereinafter with reference to the drawings, in which.

DETAILED DESCRIPTION OF THE PREFERRED EMBODIMENTS

Embodiment 1

Figure 1A:
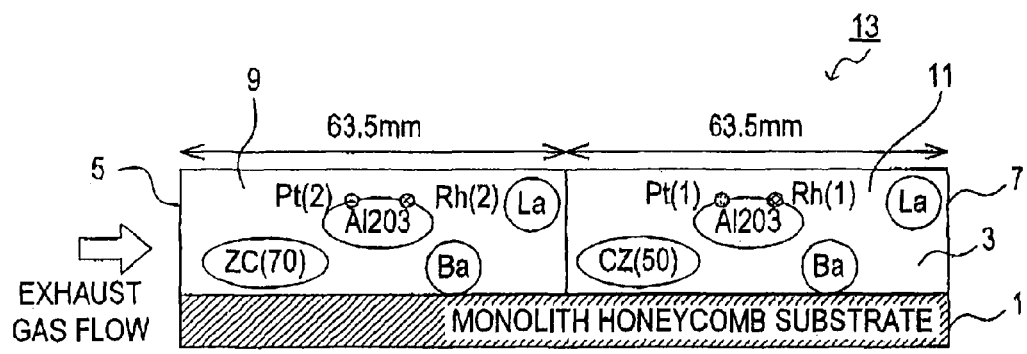
FIGS. 1A and 1B are diagrammatic explanatory views showing a structure of an exhaust gas purifying catalyst.
Figure 1B:
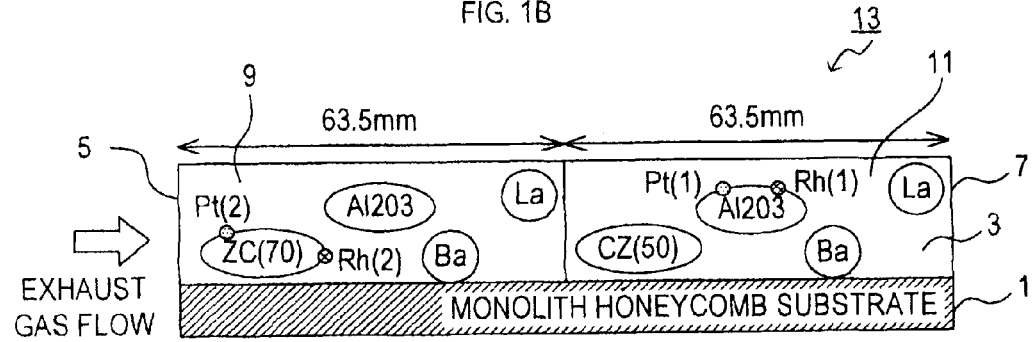

A honeycomb substrate made of cordurite is employed as a substrate 1. As shown in FIGS. 1A and 1B, the substrate 1, includes a through hole 3 extending in an axial direction and having a constant cross-sectional area. The entire length of the through hole 3 is 127 mm. In FIGS. 1A and 1B, a left end and a right end of the through hole 3 are an entrance end 5 and an exit end 7, respectively.

Exhaust gas enters the through hole 3 from the entrance end 5, passes through the through hole 3, and exits from the exit end 7. Accordingly, the though hole 3 shown in FIGS. 1A and 1B constitutes a passage of exhaust gas, in which the flow direction of exhaust gas is in a left to right direction. Although only one through hole 3 is indicated in FIGS. 1A and 1B, there actually are multiple through holes 3 formed in parallel with one another.

First, below listed components are mixed and dried to prepare a carrier powder H1.

(Carrier Powder H1)
activated alumina: 47 g
Pt nitrate solution: an amount containing 2 g of metal
Rh nitrate solution: an amount containing 2 g of metal Then, below listed components are mixed to prepare a slurry S1.

(Slurry S1)
the carrier powder H1: 51 g
powder of a ZrCe mixed oxide (the oxide equivalent weight of Zr is 70 wt % of the oxide equivalent weight of Zr and Ce contained in the ZrCe mixed oxide): 50 g
Ba sulfate powder: 10 g
La carbonate: 5 g
aluminia hydrate: equivalent to 3 g of $Al_2O_3$
water: an appropriate amount As shown in FIG. 1A, the slurry S1 is applied to coat an internal surface of the through hole 3 of the substrate 1 over a range of 63.5 mm from the entrance end 5 (an area A) and is dried. Then, calcination is performed at a temperature of 350° C. or higher for an hour. In this process, a catalyst coating layer (hereinafter referred to as an "upstream side catalyst coating layer 9") is formed on the internal surface of the through hole 3 over a range of 63.5 mm from the entrance end 5.

Subsequently, below listed components are mixed and dried to prepare a carrier powder H2.

(Carrier Powder H2)
activated alumina: 47 g
Pt nitrate solution: an amount containing 1 g of metal
Rh nitrate solution: an amount containing 1 g of metal Then, below listed components are mixed to prepare a slurry S2.

(Slurry S2)
the carrier powder H2: 49 g
powder of a ZrCe mixed oxide (the oxide equivalent weight of Ce is 50 wt % of the oxide equivalent weight of Zr and Ce contained in the ZrCe mixed oxide): 50 g
Ba sulfate powder: 10 g La carbonate: 5 g
alumina hydrate: equivalent to 3 g of $Al_2O_3$
water: an appropriate amount As shown in FIG. 1A, the slurry S2 is applied to coat an internal surface of the through hole 3 of the substrate 1 over a range of 63.5 mm from the exit end 7 (an area B) and is dried. Then, calcination is performed at a temperature of 350° C. or higher for an hour. In this process, a catalyst coating layer (hereinafter referred to as a "downstream side catalyst coating layer 11") is formed on the internal surface of the through hole 3 over a range of 63.5 mm from the exit end 7, and thus an exhaust gas purifying catalyst 13 is produced.

In FIGS. 1A and 1B and the after-mentioned FIG. 2A through FIG. 7, Pt(n) and Rh(n) mean that the respective amounts of Pt and Rh contained in the upstream side catalyst coating layer 9 or the downstream side catalyst coating layer 11 are n grams, respectively. ZC(n) means a ZrCe mixed oxide in which the oxide equivalent weight of Zr is n wt % of the total oxide equivalent weight of the ZrCe mixed oxide. CZ(n) means a ZrCe mixed oxide in which the oxide equivalent weight of Ce is n wt % of the total oxide equivalent weight of the ZrCe mixed oxide. Ce(100) means a Ce oxide, while Zr(100) means a Zr oxide.

Embodiment 2

Although an exhaust gas purifying catalyst 13 in Embodiment 2 is produced basically in the same manner as in Embodiment 1, there are some differences. Accordingly, a description will now be made mainly with respect to the differences.

In Embodiment 2, a carrier powder H3 as described below is prepared in place of the carrier powder H1.

(Carrier Powder H3)
powder of a ZrCe mixed oxide (the oxide equivalent weight of Zr is 70 wt % of the oxide equivalent weight of Zr and Ce contained in the ZrCe mixed oxide): 50 g
Pt nitrate solution: an amount containing 2 g of metal
Rh nitrate solution: an amount containing 2 g of metal A slurry S3 as described below is used in place of the slurry 1 in order to form the upstream side catalyst coating layer 9.

(Slurry S3)
the carrier powder H3: 54 g
activated alumina: 47 g
Ba sulfate powder: 10 g
La carbonate: 5 g
alumina hydrate: equivalent to 3 g of $Al_2O_3$
water: an appropriate amount That is, 47 g of activated alumina contained in the carrier powder H1 and 50 g of the powder of the ZrCe mixed oxide contained in the slurry S1 in Embodiment 1 are interchanged in Embodiment 2. As a result, Pt and Rh as precious metals are combined not with alumina but with the ZrCe mixed oxide, as shown in FIG. 1B.

Embodiment 3

Although an exhaust gas purifying catalyst 13 in Embodiment 3 is produced basically in the same manner as in Embodiment 1, there are some differences. Accordingly, a description will be made below mainly with respect to the differences.

In Embodiment 3, a slurry S4 as described below is used in place of the slurry S1 in order to form the upstream side catalyst coating layer 9.

Figure 2A:
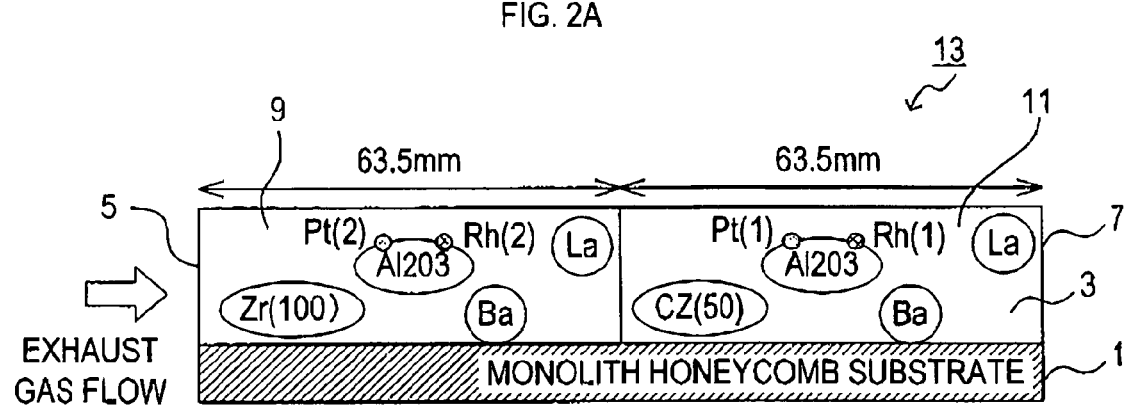
FIGS. 2A and 2B are diagrammatic explanatory views showing a structure of an exhaust gas purifying catalyst.

(Slurry S4)
the carrier powder H1: 51 g
powder of a Zr oxide: 50 g
Ba sulfate powder: 10 g
La carbonate: 5 g
alumina hydrate: equivalent to 3 g of $Al_2O_3$
water: an appropriate amount That is, the ZrCe mixed oxide contained in the slurry S1 in Embodiment 1 is replaced by the Zr oxide in Embodiment 3. As a result, not the ZrCe mixed oxide but the Zr oxide is included in the upstream side catalyst coating layer 9, as shown in FIG. 2A.

Embodiment 4

Although an exhaust gas purifying catalyst 13 in Embodiment 4 is produced basically in the same manner as in Embodiment 1, there are some differences. Accordingly, a description will be made below mainly with respect to the differences.

In Embodiment 4, a slurry S5 as described below is used in place of the slurry S2 in order to form the downstream side catalyst coating layer 11.

Figure 2B:
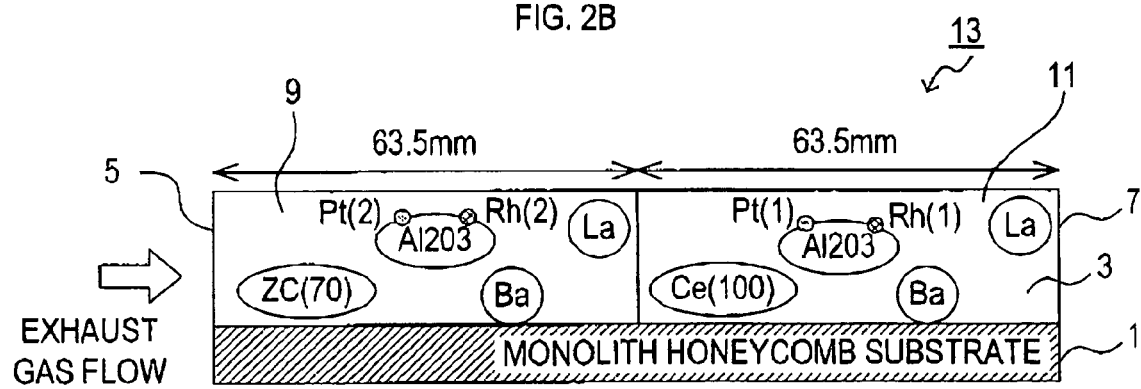

(Slurry S5)
the carrier powder H2: 49 g
Ce oxide: 50 g
Ba sulfate powder: 10 g
La carbonate: 5 g
alumina hydrate: equivalent to 3 g of $Al_2O_3$
water: an appropriate amount That is, the ZrCe mixed oxide including 50 wt % of Ce contained in the slurry S2 in Embodiment 1 is replaced by the Ce oxide in Embodiment 4. As a result, not the ZrCe mixed oxide but the Ce oxide is included in the downstream side catalyst coating layer 11, as shown in FIG. 2B.

Embodiment 5

Although an exhaust gas purifying catalyst 13 in Embodiment 5 is produced basically in the same manner as in Embodiment 1, there are some differences. Accordingly, a description will be made below mainly with respect to the differences.

In Embodiment 5, a slurry S6 as described below is used in place of the slurry S2 in order to form the downstream side catalyst coating layer 11.

Figure 3A:
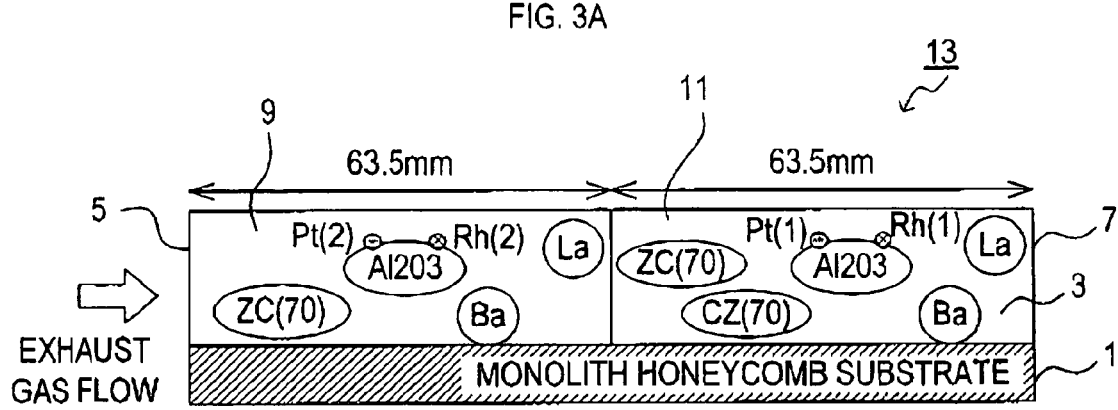
FIGS. 3A and 3B are diagrammatic explanatory views showing a structure of an exhaust gas purifying catalyst.

(Slurry S6)
the carrier powder H2: 49 g
powder of a ZrCe mixed oxide (the oxide equivalent weight of Zr is 70 wt % of the oxide equivalent weight of Zr and Ce contained in the ZrCe mixed oxide): 25 g
powder of a ZrCe mixed oxide (the oxide equivalent weight of Ce is 70 wt % of the oxide equivalent weight of Zr and Ce contained in the ZrCe mixed oxide): 25 g
Ba sulfate powder: 10 g
La carbonate: 5 g
alumina hydrate: equivalent to 3 g of $Al_2O_3$
water: an appropriate amount That is, the ZrCe mixed oxide (the oxide equivalent weight of Ce is 50 wt % of the oxide equivalent weight of Zr and Ce contained in the ZrCe mixed oxide) contained in the slurry S2 in Embodiment 1 is replaced by the ZrCe mixed oxide (the oxide equivalent weight of Zr is 70 wt % of the oxide equivalent weight of Zr and Ce contained in the ZrCe mixed oxide) and the ZrCe mixed oxide (the oxide equivalent weight of Ce is 70 wt % of the oxide equivalent weight of Zr and Ce contained in the ZrCe mixed oxide) in Embodiment 5. As a result, the ZrCe mixed oxide (the oxide equivalent weight of Zr is 70 wt % of the oxide equivalent weight of Zr and Ce contained in the ZrCe mixed oxide) and the ZrCe mixed oxide (the oxide equivalent weight of Ce is 70 wt % of the oxide equivalent weight of Zr and Ce contained in the ZrCe mixed oxide) are included in the downstream side catalyst coating layer 11, as shown in FIG. 3A.

Embodiment 6

The substrate 1 used in Embodiment 6 is the same as in Embodiments 1 through 5.

First, below listed components are mixed and dried to prepare a carrier powder H4.

(Carrier Powder H4)
activated alumina: 8.5 g
Pt nitrate solution: an amount containing 2 g of metal
Rh nitrate solution: an amount containing 2 g of metal Then, below listed components are mixed to prepare a slurry S7.

(Slurry S7)
the carrier powder H4: 12.5 g
powder of a ZrCe mixed oxide (the oxide equivalent weight of Zr is 70 wt % of the oxide equivalent weight of Zr and Ce contained in the ZrCe mixed oxide): 9 g
Ba sulfate powder: 1.8 g
La carbonate: 0.9 g
alumina hydrate: equivalent to 0.5 g of $Al_2O_3$
water: an appropriate amount The slurry S7 is applied to coat an internal surface of the through hole 3 of the substrate 1 over a range of 13 mm from the entrance end 5 (an area A) and is dried. Then, calcination is performed at a temperature of 350° C. or higher for an hour. In this process, a catalyst coating layer (an upstream side catalyst coating layer 9) is formed on the internal surface of the through hole 3 over a range of 13 mm from the entrance end 5 (see FIG. 3B).

Subsequently, below listed components are mixed and dried to prepare a carrier powder H5.

(Carrier Powder H6)
activated alumina: 85.5 g
Pt nitrate solution: an amount containing 1 g of metal
Rh nitrate solution: an amount containing 1 g of metal Then, below listed components are mixed to prepare a slurry S8.

Figure 3B:
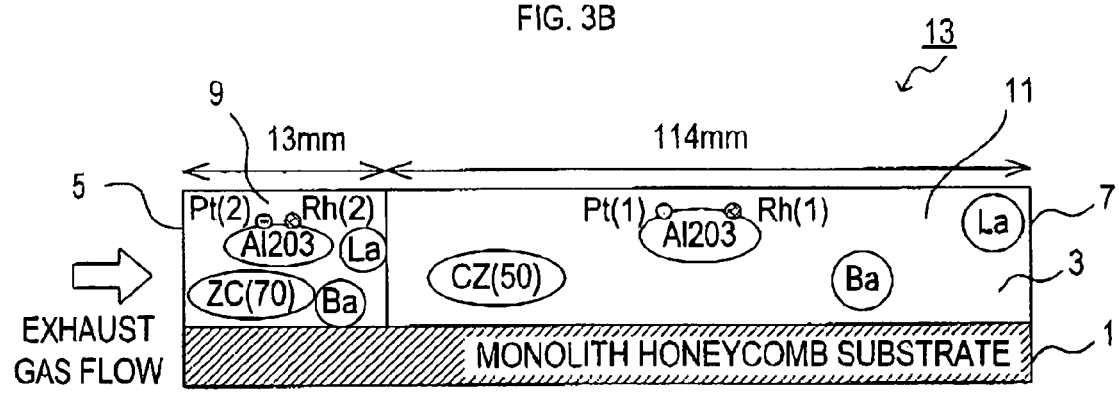

(Slurry S8)
the carrier powder H5: 87.5 g
powder of a ZrCe mixed oxide (The oxide equivalent weight of Ce is 0.50 wt % of the oxide equivalent weight of Zr and Ce contained in the ZrCe mixed oxide.): 91 g
Ba sulfate powder: 18.2 g
La carbonate: 9.1 g
alumina hydrate: equivalent to 5.5 g of $Al_2O_3$
water: an appropriate amount The slurry S8 is applied to coat an internal surface of the through hole 3 of the substrate 1 over a range of 114 mm from the exit end 7 (an area B) and is dried. Then, calcination is performed at a temperature of 350° C. or higher for an hour. In this process, a catalyst coating layer (a downstream side catalyst coating layer 11) is formed on the internal surface of the through hole 3 over a range of 114 mm from the exit end 7, and thus an exhaust gas purifying catalyst 13 is produced as shown in FIG. 3B.

Embodiment 7

Although an exhaust gas purifying catalyst 13 in Embodiment 7 is produced basically in the same manner as in Embodiment 1, there are some differences. Accordingly, a description will now be made mainly with respect to the differences.

In Embodiment 7, a carrier powder H6 as described below is prepared in place of the carrier powder H1.

(Carrier Powder H6)
activated alumina: 47 g
Pt nitrate solution: an amount containing 2.7 g of metal
Rh nitrate solution: an amount containing 2.7 g of metal And a slurry S9 as described below is used in place of the slurry S1 in order to form the upstream side catalyst coating layer 9.

(Slurry S9)
the carrier powder H6: 51.4 g
powder of a ZrCe mixed oxide (The oxide equivalent weight of Zr is 70 wt % of the oxide equivalent weight of Zr and Ce contained in the ZrCe mixed oxide.): 50 g
Ba sulfate powder: 10 g
La carbonate: 5 g
alumina hydrate: equivalent to 3 g of $Al_2O_3$
water: an appropriate amount Also, in Embodiment 7, a carrier powder H7 as described below is prepared in place of the carrier powder H2.

(Carrier Powder H7)
activated alumina: 47 g
Pt nitrate solution: an amount containing 0.3 g of metal
Rh nitrate solution: an amount containing 0.3 g of metal And a slurry S10 as described below is used in place of the slurry S2 in order to form the downstream side catalyst coating layer 11.

Figure 4:
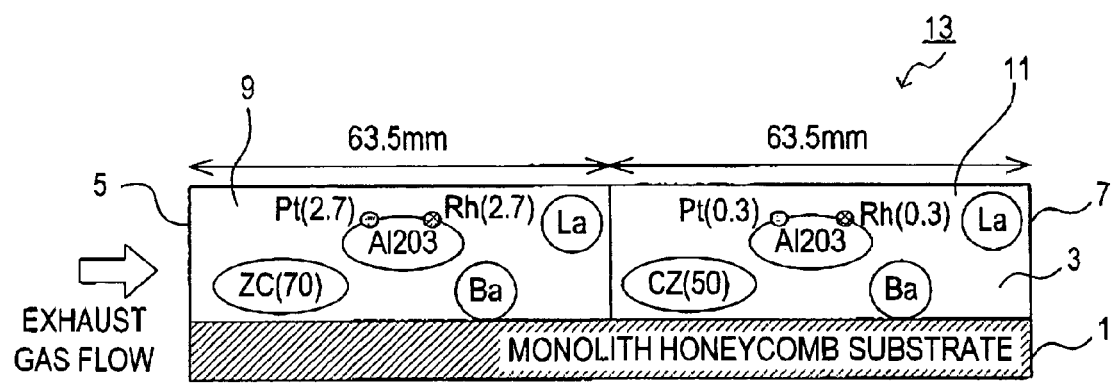
FIG. 4 is a diagrammatic explanatory view showing a structure of an exhaust gas purifying catalyst.

(Slurry S10)
the carrier powder H7: 47.6 g
powder of a ZrCe mixed oxide (The oxide equivalent weight of Ce is 50 wt % of the oxide equivalent weight of Zr and Ce contained in the ZrCe mixed oxide.): 50 g
Ba sulfate powder: 10 g
La carbonate: 5 g
alumina hydrate: equivalent to 3 g of $Al_2O_3$
water: an appropriate amount Compared with Embodiment 1, each of the amounts of Pt and Rh contained in the upstream side catalyst coating layer 9 is changed to 2.7 g, and each of the amounts of Pt and Rh contained in the downstream side catalyst coating layer 11 is changed to 0.3 g in Embodiment 7, as shown in FIG. 4.

Embodiment 8

Although an exhaust gas purifying catalyst 13 in Embodiment 8 is produced basically in the same manner as in Embodiment 1, there are some differences. Accordingly, a description will now be made mainly with respect to the differences.

Figure 5A:
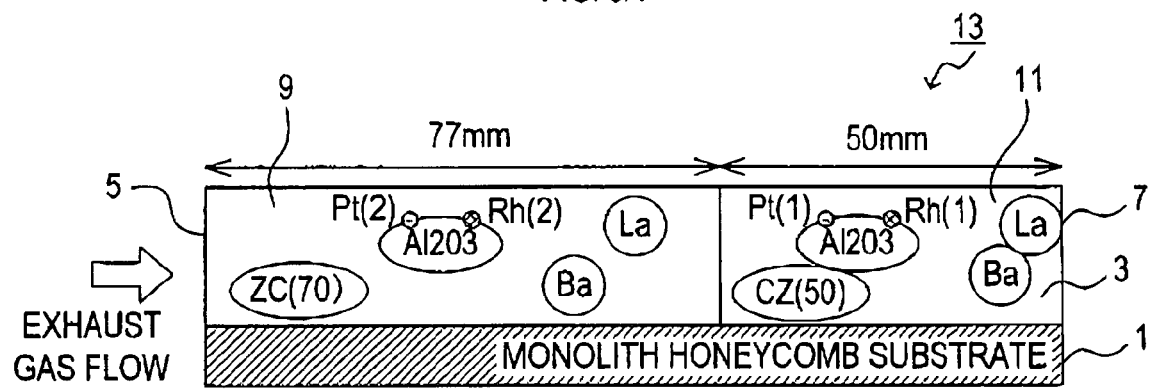
FIGS. 5A and 5B are diagrammatic explanatory views showing a structure of an exhaust gas purifying catalyst.

In Embodiment 8, the upstream side catalyst coating layer 9 is formed on an internal surface of the through hole 3 over a range of 77 mm from the entrance end 5 (see FIG. 5A). The downstream side catalyst coating layer 11 is formed on an internal surface of the through hole 3 over a range of 50 mm from the exit end 7.

Embodiment 9

Although an exhaust gas purifying catalyst 13 in Embodiment 9 is produced basically in the same manner as in Embodiment 1, there are some differences. Accordingly, a description will now be made mainly with respect to the differences.

Figure 5B:
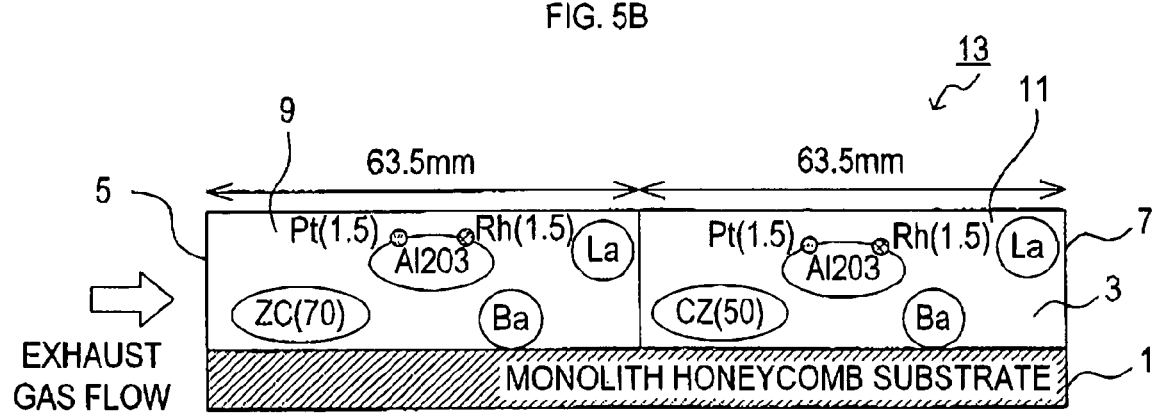

In Embodiment 9, a carrier powder H8 as described below is prepared in place of the carrier powder H1.
(Carrier Powder H8)
activated alumina: 47 g
Pt nitrate solution: an amount containing 1.9 g of metal
Rh nitrate solution: an amount containing 1.9 g of metal
And a slurry S11 as described below is used in place of the slurry S1 in order to form the upstream side catalyst coating layer 9.
(Slurry S11)
the carrier powder H8: 51 g
powder of a ZrCe mixed oxide (The oxide equivalent weight of Zr is 70 wt % of the oxide equivalent weight of Zr and Ce contained in the ZrCe mixed oxide.): 50 g
Ba sulfate powder: 10 g
La carbonate: 5 g
alumina hydrate: equivalent to 3 g of $Al_2O_3$
water: an appropriate amount
Also, in Embodiment 9, a carrier powder H9 as described below is prepared in place of the carrier powder H2.
(Carrier Powder H9)
activated alumina 47 g
Pt nitrate solution: an amount containing 1.5 g of metal
Rh nitrate solution: an amount containing 1.5 g of metal
And a slurry S12 as described below is used in place of the slurry S2 in order to form the downstream side catalyst coating layer 11.
(Slurry S12)
the carrier powder H9: 50 g
powder of a ZrCe mixed oxide (The oxide equivalent weight of Ce is 50 wt % of the oxide equivalent weight of Zr and Ce contained in the ZrCe mixed oxide.): 50 g
Ba sulfate powder: 10 g
La carbonate: 5 g
alumina hydrate: equivalent to 3 g of $Al_2O_3$
water: an appropriate amount
Compared with Embodiment 1, each of the amounts of Pt and Rh contained in the upstream side catalyst coating layer 9 is changed to 1.5 g, and each of the amounts of Pt and Rh contained in the downstream side catalyst coating layer 11 is changed to 1.5 g in Embodiment 9, as shown in FIG. 5B.

Comparative Example 1

Figure 6A:
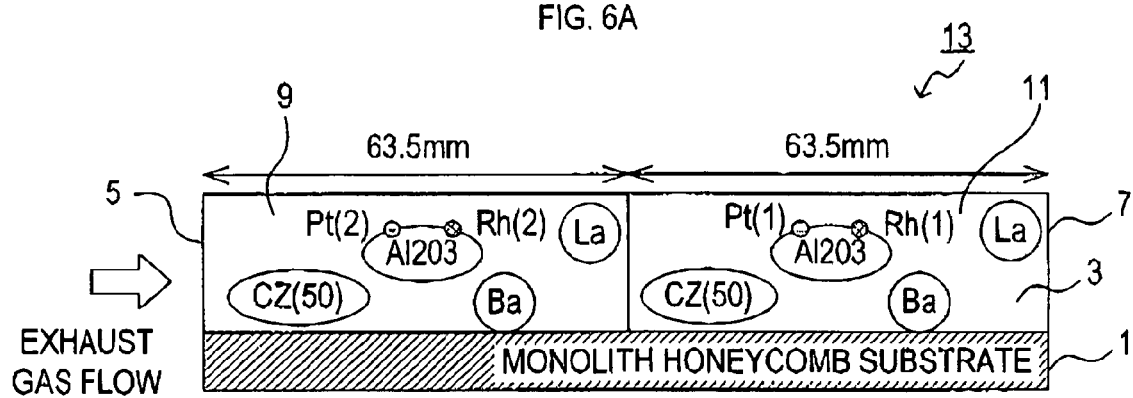
FIGS. 6A and 6B are diagrammatic explanatory views showing a structure of an exhaust gas purifying catalyst.

Although an exhaust gas purifying catalyst 13 in Comparative Example 1 is produced basically in the same manner as in Embodiment 1, there are some differences. Accordingly, a description will now be made mainly with respect to the differences.
In Comparative Example 1, a slurry S13 as described below is used in place of the slurry S1 in order to form the upstream side catalyst coating layer 9.
(Slurry S13)
the carrier powder H1: 51 g
powder of a ZrCe mixed oxide (The oxide equivalent weight of Zr is 70 wt % of the oxide equivalent weight of Zr and Ce contained in the ZrCe mixed oxide.): 50 g
Ba sulfate powder: 10 g
La carbonate: 5 g
alumina hydrate: equivalent to 3 g of $Al_2O_3$
water: an appropriate amount
That is, the ZrCe mixed oxide (The oxide equivalent weight of Zr is 70 wt % of the oxide equivalent weight of Zr and Ce contained in the ZrCe mixed oxide.) contained in the slurry S1 in Embodiment 1 is replaced by the ZrCe mixed oxide (The oxide equivalent weight of Zr is 50 wt % of the oxide equivalent weight of Zr and Ce contained in the ZrCe mixed oxide.) in Comparative Example 1. As a result, the ZrCe mixed oxide (The oxide equivalent weight of Zr is 50 wt % of the oxide equivalent weight of Zr and Ce contained in the ZrCe mixed oxide.) is included in the upstream side catalyst coating layer 9, as shown in FIG. 6A.

Comparative Example 2

Figure 6B:
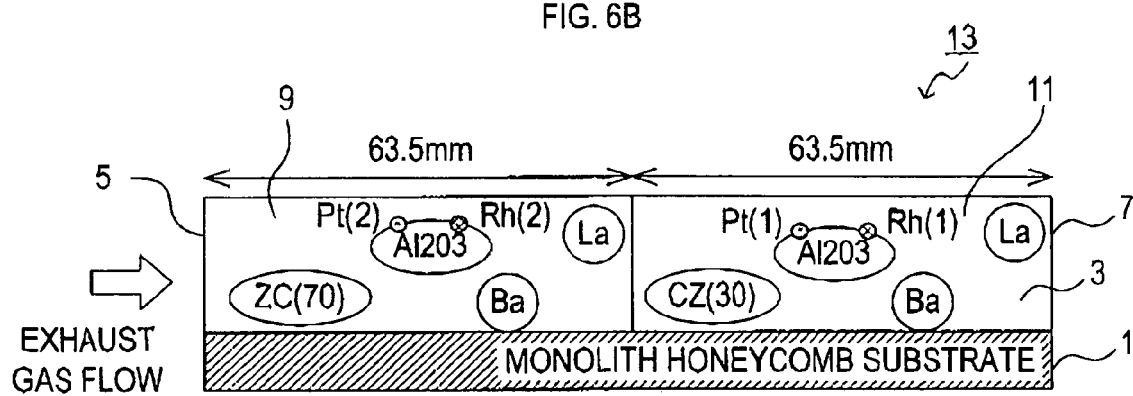

Although an exhaust gas purifying catalyst 13 in Comparative Example 2 is produced basically in the same manner as in Embodiment 1, there are some differences. Accordingly, a description will now be made mainly with respect to the differences.
In Comparative Example 2, a slurry S14 as described below is used in place of the slurry S2 in order to form the downstream side catalyst coating layer 11.
(Slurry S14)
the carrier powder H2: 49 g
powder of a ZrCe mixed oxide (The oxide equivalent weight of Ce is 30 wt % of the oxide equivalent weight of Zr and Ce contained in the ZrCe mixed oxide.): 50 g
Ba sulfate powder: 10 g
La carbonate: 5 g
alumina hydrate: equivalent to 3 g of $Al_2O_3$
water: an appropriate amount
That is, the ZrCe mixed oxide (The oxide equivalent weight of Ce is 50 wt % of the oxide equivalent weight of Zr and Ce contained in the ZrCe mixed oxide.) contained in the slurry S2 in Embodiment 1 is replaced by the ZrCe mixed oxide (The oxide equivalent weight of Ce is 30 wt % of the oxide equivalent weight of Zr and Ce contained in the ZrCe mixed oxide.) in Comparative Example 2. As a result, the ZrCe mixed oxide (The oxide equivalent weight of Ce is 30 wt % of the oxide equivalent weight of Zr and Ce contained in the ZrCe mixed oxide.) is included in the downstream side catalyst coating layer 11, as shown in FIG. 6B.

Comparative Example 3

The substrate 1 used in Comparative Example 3 is the same as in Embodiments 1 through 9 and Comparative Examples 1 and 2.
First, below listed components are mixed and dried to prepare a carrier powder H10.
(Carrier Powder H10)
activated alumina: 94 g
Pt nitrate solution: an amount containing 3 g of metal
Rh nitrate solution: an amount containing 3 g of metal
Then, below listed components are mixed to prepare a slurry S15.
(Slurry S15)
the carrier powder H10: 100 g
powder of a ZrCe mixed oxide (The oxide equivalent weight of Zr is 70 wt % of the oxide equivalent weight of Zr and Ce contained in the ZrCe mixed oxide.): 50 g
powder of a ZrCe mixed oxide (The oxide equivalent weight of Zr is 50 wt % of the oxide equivalent weight of Zr and Ce contained in the ZrCe mixed oxide.): 50 g
Ba sulfate powder: 20 g
La carbonate: 10 g
alumina hydrate: equivalent to 6 g of $Al_2O_3$
water: an appropriate amount
The slurry S15 is applied to coat an entire internal surface of the through hole 3 of the substrate 1 (over a range from the entrance end 5 to the exit end 7) and is dried. Then, calcination is performed at a temperature of 350° C. or higher for an hour.

Figure 7:
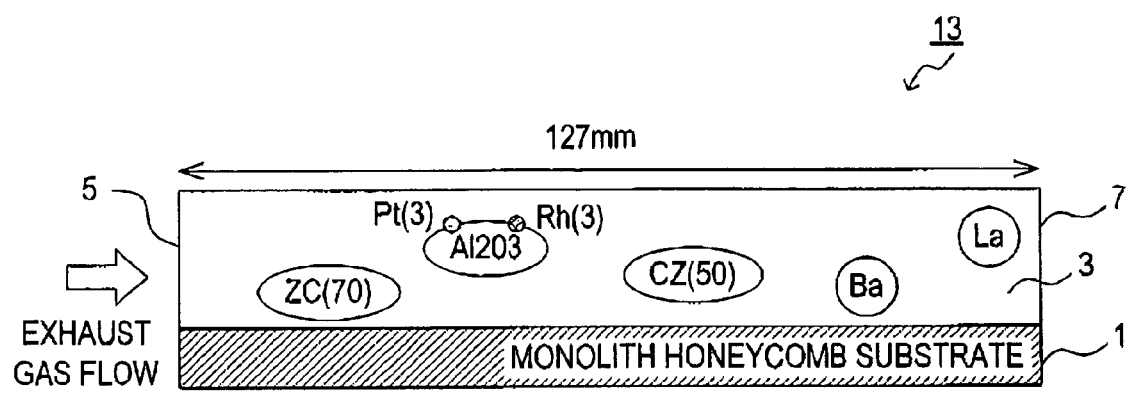
FIG. 7 is a diagrammatic explanatory view showing a structure of an exhaust gas purifying catalyst.

In this process, a uniform catalyst coating layer is formed over the entire internal surface of the through hole 3 (see FIG. 7).

An explanation will now be made about an experiment to examine the warm-up performance and the durability of the exhaust gas purifying catalysts 13 respectively produced according to Embodiments 1 through 9 and Comparative Examples 1 through 3.

Each of the exhaust gas purifying catalysts 13 according to Embodiments 1 through 9 and Comparative Examples 1 through 3 was attached to a gasoline engine, and the experiment was conducted under the following conditions.

(Conditions in the Experiment)
Engine: 4.0 L engine
A/F: 14.6
Entering Gas Temperature: 900° C.
Experiment Time: 50 hours
Car: 2.2 L engine car
Mounting Position of Catalyst: at a distance of 30 cm immediately beneath the engine
Evaluation Mode: US LA#4 mode Then, the Bag1HC purification rate (%) was measured as an evaluation index corresponding to the warm-up performance. Also, the total emission, as an evaluation index corresponding to the durability, was measured with respect to each of NMHC, CO and NOx. The results are shown in Table 1.

TABLE 1

| | LA#4 Mode Purification Performance | | | |
|---|---|---|---|---|
| | Bag1HC Purification Rate (%) | Total Emission (g/mile) | | |
| | | NMHC | CO | NOx |
| Embodiment 1 | 90 | 0.020 | 0.70 | 0.030 |
| Embodiment 2 | 90 | 0.018 | 0.70 | 0.033 |
| Embodiment 3 | 92 | 0.017 | 0.68 | 0.035 |
| Embodiment 4 | 89 | 0.023 | 0.72 | 0.027 |
| Embodiment 5 | 91 | 0.020 | 0.68 | 0.031 |
| Embodiment 6 | 93 | 0.022 | 0.72 | 0.035 |
| Embodiment 7 | 93 | 0.019 | 0.70 | 0.032 |
| Embodiment 8 | 87 | 0.025 | 0.72 | 0.035 |
| Embodiment 9 | 86 | 0.027 | 0.71 | 0.029 |
| Comparative Example 1 | 83 | 0.030 | 0.71 | 0.030 |
| Comparative Example 2 | 90 | 0.020 | 0.72 | 0.048 |
| Comparative Example 3 | 81 | 0.033 | 0.77 | 0.046 |

As shown in Table 1, the exhaust gas purifying catalysts 13 according to Embodiments 1 through 9 respectively provide high Bag1HC purification rates (%) and reduce the total emission.

In the exhaust gas purifying catalysts 13 according to Embodiments 1 through 7, the length of the upstream catalyst coating layer 9 is within a range of 10% to 50% of the total length of the through hole 3. Accordingly, these exhaust gas purifying catalysts 13 are superior in terms of the Bag1HC purification rate (%) and the total emission (especially NMHC and NOx) compared with Embodiment 8 in which the length is beyond the above range.

Also, in the exhaust gas purifying catalysts 13 according to Embodiments 1 through 7, the proportions between the weight of the precious metal contained in the upstream catalyst coating layer 9 and the weight of the precious metal contained in the downstream catalyst coating layer 11 are within a range from 2:1 to 10:1. Accordingly, these exhaust gas purifying catalysts 13 are superior in terms of the Bag1HC purification rate (%) and the total emission (especially NMHC) as compared with Embodiment 9 in which the weight is beyond the above range.

In contrast, in Comparative Example 1, the oxide equivalent content of Zr contained in the upstream catalyst coating layer 9 is 50 wt % of the oxide equivalent weight of Zr and Ce contained in the ZrCe mixed oxide, i.e., beyond a range of 51-100 wt %. Accordingly, the exhaust gas purifying catalyst 13 of Comparative Example 1 is inferior in terms of the Bag1HC purification rate (%) and the total emission (especially NMHC).

In Comparative Example 2, the oxide equivalent content of Ce contained in the downstream catalyst coating layer 11 is 30 wt % of the oxide equivalent weight of Zr and Ce contained in the ZrCe mixed oxide, i.e., beyond a range of 58-100 wt %. Accordingly, the exhaust gas purifying catalyst 13 of Comparative Example 2 is inferior in terms of the Bag1HC purification rate (%) and the total emission (especially NOx).

In Comparative Example 3, the coating layer is not divided into the upstream catalyst coating layer 9 and the downstream catalyst coating layer 11. Accordingly, the exhaust gas purifying catalyst 13 of Comparative Example 3 is inferior in terms of the Bag1HC purification rate (%) and the total emission (NMHC, CO and NOx).

It is to be understood that the present invention should not be limited to the above described embodiments, but may be practiced in various forms within the scope not departing from the subject matter of the present invention.

For example, the precious metal carried by the upstream catalyst coating layer 9 or the downstream catalyst coating layer 11 in Embodiments 1 through 9 may be a combination of Pd and Rh, or may be a single type of precious metal. It has been confirmed that the same effects are shown in the same experiments in these cases.

Also, the exhaust gas purifying catalysts 13 according to Embodiments 1 through 9 may be produced by coating the substrate 1 with a refractory inorganic oxide (alumina, Zr oxide, Ce oxide, Zr Ce mixed oxide) and subsequently soaking the coated substrate 1 in a slurry containing a precious metal (Pt, Rh).

What is claimed is:

1. An exhaust gas purifying catalyst comprising:
a substrate having a through hole penetrating the substrate in an axial direction; and
the through hole forms a passage for an exhaust gas,
an upstream catalyst coating layer being formed on an internal surface of an area A located on an upstream portion of the passage, with respect to a flow direction of the exhaust gas through the through hole, and the upstream catalyst coating layer consisting of:
a precious metal, barium (Ba) and lanthanum (La); and
at least one of:
a Zr oxide,
a mixture of Zr oxide and a ZrCe mixed oxide,
a mixture of Zr oxide and Ce oxide, and
a mixture of Zr oxide, a Ce oxide and ZrCe mixed oxide, and
the upstream catalyst coating layer contains at least Zr oxide in which an oxide equivalent weight of Zr, contained in area A, is within a range of 51 to 100 wt % of an oxide equivalent weight of Zr and Ce contained in the area A, and
a downstream catalyst coating layer formed on an internal surface of an area B located on a downstream portion of the passage with respect to the flow direction of the exhaust gas through the through hole, the downstream catalyst coating layer consisting of:

a precious metal, barium (Ba) and lanthanum (La); and
at least one of:
   a Ce oxide,
   a ZrCe mixed oxide; and
   a mixture of Ce oxide and a ZrCe mixed oxide; and
the downstream catalyst coating layer contains at least one of Ce oxide and ZrCe mixed oxide in which an oxide equivalent weight of Ce, contained in area B, is within a range of 58 to 100 wt % of an oxide equivalent weight of Zr and Ce, contained in the area B.

2. The exhaust gas purifying catalyst according to claim 1, wherein a length of area A along the passage is equal to or less than 50% of an entire length of the passage.

* * * * *